UNITED STATES PATENT OFFICE.

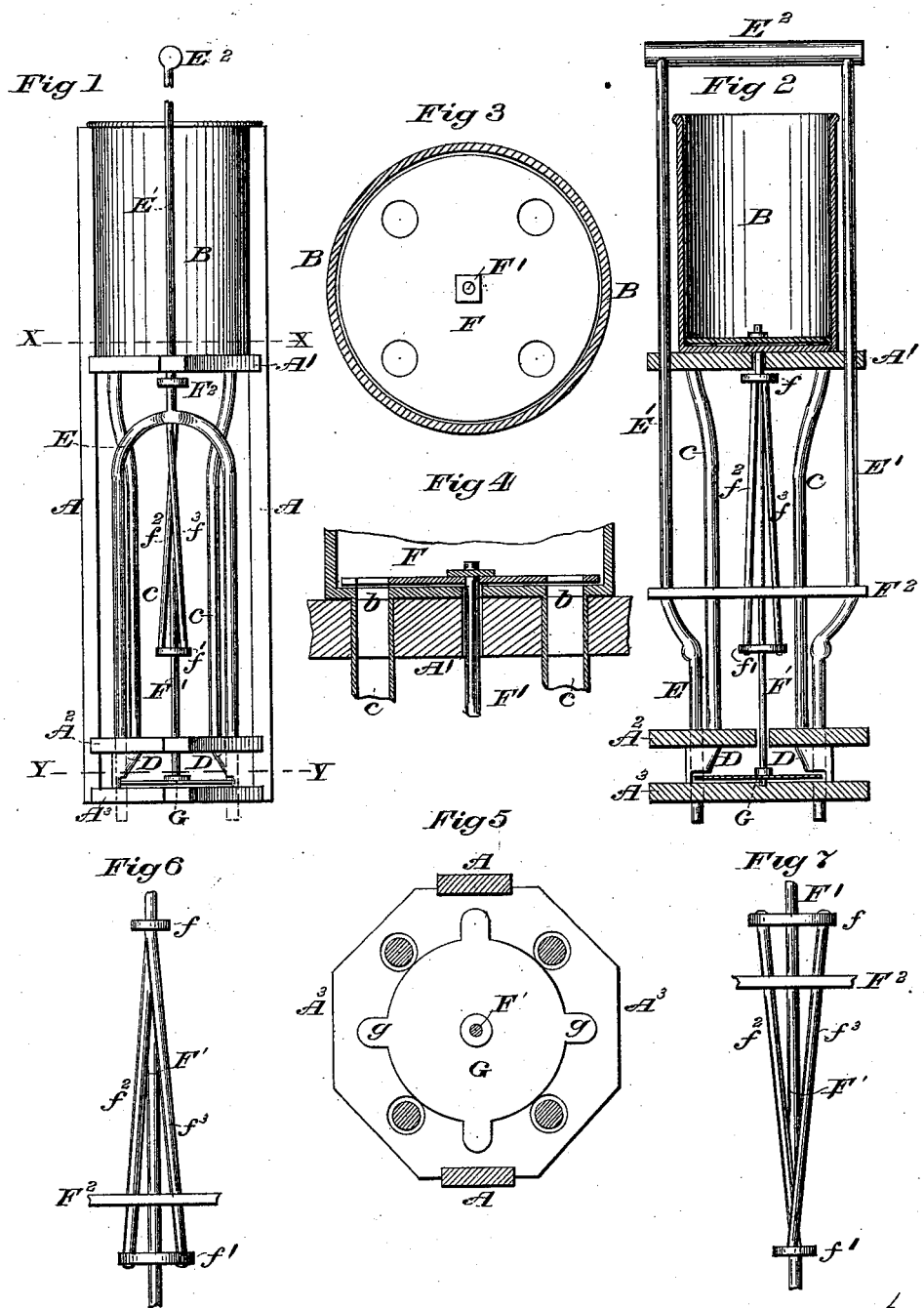

WILLIAM SHEPARD, OF JONESBURG, MISSOURI.

IMPROVEMENT IN HAND CORN-PLANTERS.

Specification forming part of Letters Patent No. 209,929, dated November 12, 1878; application filed June 27, 1877.

*To all whom it may concern:*

Be it known that I, WILLIAM SHEPARD, of Jonesburg, Montgomery county, and State of Missouri, have invented an Improved Hand Seed-Planter, of which the following is a specification:

This invention will first be fully described, and hereinafter pointed out in the claims.

Of the drawing, Figure 1 is a side elevation, the plunger parts being raised to their highest point. Fig. 2 is a sectional elevation, the plunger parts being lowered. Fig. 3 is a plan section of the grain-holder on line $x\ x$. Fig. 4 is a sectional elevation, on line $x\ x$, of the grain-holder bottom, its cut-off, and feed-tubes. Fig. 5 is a plan section on line $y\ y$, Figs. 6 and 7 being detail views of the parts that impart part-rotary motion to the cut-offs.

I will first describe the manner of constructing my seed-planter, and then its operation.

A represents the frame-work to contain the operating parts. B represents the grain or seed holder. This is properly secured between the frame A, and rests upon a support, A', which forms part of the frame. (See Figs. 1, 2.) The bottom of the holder B has two or more equidistant holes, $b$, (see Fig. 4,) through which the corn passes to be deposited.

C C represent the feed-tubes. These have their upper ends passed through the support A¹ to connect and communicate with the holes $b$ of the corn-holder. (See Figs. 1, 2, 3.) The number of feed-tubes correspond with the holes to pass the seed from the holder or receptacle. The lower end of the feed-tubes C pass through the lower support, A², which forms part of the frame, and communicate with the discharge-tubes D D, of which there are, as here shown, four, and hence, as will hereinafter appear, four seeds can be deposited at one time in the ground. The discharge-tubes D have their upper and lower ends secured between the support A² and the lowest support, A³. The bottom support, A³, has holes in line with the action of the plungers, and in line with the discharge of the tubes D, for the seed to pass out of the latter when acted upon by the plungers.

It will be noted that the upper part of each discharge-tube D is sufficiently wide to allow the grain to pass under the plunger. (See Figs. 1, 2.)

I combine the plungers with the handle, and further combine the action of the plungers to operate the respective cut-offs.

E represents the plungers. These are forked, (see Fig. 1,) so that each pair of plungers operate in pairs of discharge-tubes. E¹ are the plunger-rods. These are connected to each pair of plungers, and said rods at top carry the handle E². The rods E¹ pass through and are guided by the support A¹. The action of the forked plungers is guided by the supports A² A³. By therefore lifting the plungers the grain in each discharge-tube is permitted to drop to the lowest point, and then, by thrusting the plungers down, the grain can be buried in the ground.

I utilize the up-and-down thrust which the operator imparts to the plungers to simultaneously operate the cut-off contained in the grain-holder, and also the cut-off arranged below, to open or shut the discharge-tubes.

F represents the cut-off contained in the bottom of the grain-holder. It is a round disk, having holes in line with the holes $b$ of the grain-holder. (See Figs. 3, 4.) This cut-off I secure to the end of a shaft, F¹, which passes through B, through A¹, and through a cross-piece, F², which forms part of the plunger-rods. Thence said shaft passes below, and has its bearing in the lower support, A³. (See Figs. 1, 2.) The lower cut-off, G, is also attached to the shaft F¹, so as to operate top of the support A³. The cut-off G is also a round disk or plate, but having the projections $g$ to control the opening in each discharge-tube. (See Fig. 5.)

The arrangement on the shaft of the lower cut-off with relation to the top cut-off is such that the former closes the discharge-openings when the latter opens the feed-holes $b$. To cause the cut-offs to operate as just stated, I secure on the shaft F¹ the upper and lower bearings, $f f^1$, the former being arranged horizontally and the latter transversely. Farther alongside of the shaft F¹ are the stems $f^2 f^3$, the ends of each of which are secured to the bearings $f f^1$, so as to assume the inclined position indicated in Figs. 1, 2, 6, 7. The stems pass through the cross-piece F², so as to be actuated by its operation. When, therefore, the plungers are raised to their highest point the upper cut-off has cleared the feed-openings and the lower cut-off, by its projections, has closed the discharge-openings. The cut-offs are in vice-versa position on the complete downthrust of the plungers. In thrusting the plungers downward the grain or seed is forced into the ground.

The improved planter being thus constructed, its operation is as follows: The grain-holder B is filled with the grain. Assuming the position of the plunger to be way down, the feeding of the grain is estopped by the closure of the feed-holder. There is but one grain in each discharge-tube when the plungers come down. At same time the projections $g$ of the lower cut-off will be some distance away from the discharge-openings, leaving these open. By next raising the plunger out of the ground the cut-off F has opened the feed-holes $b$, permitting another grain to reach the discharge-tubes directly under the plungers, and said grain is retained there, owing to the closure of the discharge-openings. In this condition the planter can be carried to the next hill, and by thrusting the plungers down the seed under the same is forced out of discharge-tubes and buried in the ground.

What I claim is—

1. The plungers E, their rods E¹, carrying the cross-piece F², the shaft F¹, having the bearings $f\,f^1$, stems $f^2\,f^3$, and the respective cut-offs F G¹, the latter having projections $g$, and said cut-offs being arranged with relation to each other as described, in combination with feed-tubes C C and discharge-tubes D D, to operate in the manner and for the purposes set forth.

2. In a hand seed-planter, the forked plungers E, their rods E¹, having the cross-piece F², the shaft F¹, carrying the bearings $f\,f^1$, stems $f^2\,f^3$, and the cut-offs F G¹, arranged with relation to each other as shown and described, and the latter having projections $g$, the feed-tubes C C, the discharge-tubes D D, the grain holder having feed-holes $b$, and the frame parts A A¹ A² A³, all said parts being combined to operate substantially in manner and for the purposes set forth.

In testimony of said invention I have hereunto set my hand.

WILLIAM SHEPARD.

Witnesses:
HOUSTON W. JOHNSON,
JOHN M. WILSON.